United States Patent [19]

Schneider

[11] Patent Number: 5,027,277
[45] Date of Patent: Jun. 25, 1991

[54] METHOD FOR SYNCHROPHASER MEASUREMENT AND SYNCHROPHASER CONTROL

[75] Inventor: Roy W. Schneider, Ellington, Conn.

[73] Assignee: United Technologies Corporation, Hartford, Conn.

[21] Appl. No.: 336,275

[22] Filed: Apr. 11, 1989

[51] Int. Cl.$^5$ .............................................. B64C 11/50
[52] U.S. Cl. ................................ 364/431.01; 416/34; 416/35; 60/702
[58] Field of Search ................... 364/424.01, 550, 565, 364/424.06, 431.01; 416/33, 34, 35

[56] References Cited

U.S. PATENT DOCUMENTS

| | | | |
|---|---|---|---|
| 3,479,822 | 11/1969 | Nelson et al. | 416/34 |
| 3,589,832 | 6/1971 | Harris | 416/34 |
| 3,689,175 | 9/1972 | Hartzell et al. | 416/34 |
| 4,245,955 | 1/1981 | Lambertson | 416/34 |
| 4,653,981 | 3/1987 | Harner et al. | 416/34 |
| 4,659,283 | 4/1987 | Niessen et al. | 416/34 |
| 4,934,825 | 6/1990 | Martin | 364/431.01 |

Primary Examiner—Thomas G. Black
Attorney, Agent, or Firm—Ronald R. Snider

[57] ABSTRACT

A method and apparatus for providing improved phase error measurement as shown and described. The measured phase error ($\phi_E$) is used as an input to a SYNCHROPHASER ® control which provides for phase control of a slave propeller with respect to a master. The phase error ($\phi_E$) is the sum of the sensed phase error and 360° divided by $N_p$ times $\phi_{count}$ minus $\phi_{ref}$. $\phi_{count}$ is a counted number of phase discontinuities which occur in $\phi_S$, the sensed phase. The values of $\phi_{count}$ and $\phi_E$, measured phase output, may be limited in number and magnitude.

11 Claims, 8 Drawing Sheets

$$\phi_{TOTAL} = \phi_S + \frac{360}{N_P} \times \phi_{COUNT}$$

@ $N_P = 6$, $\phi_{TOTAL} = \phi_S + 60 \cdot \phi_{COUNT}$

EXAMPLE OF PHASE ERROR MEASUREMENT = ± 80°
Np = 6 FOR PROPELLER WITH 6 BLADES $$\phi_E = \phi_S + \frac{360}{N_p} \phi_{COUNT} - \phi_{REF}$$

$$\phi_E = \phi_S + 60 \cdot \phi_{COUNT} - 0. \quad @ \ N_p = 6, \ \phi_{REF} = 0.$$

WHERE:

$\phi_{COUNT}$ IS LIMITED TO ± 2

$\phi_E$ IS LIMITED TO ± 80.

PRIOR ART PHASE ERROR MEASUREMENT

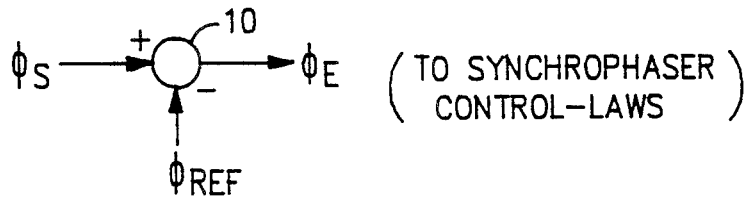

IMPROVED PHASE ERROR MEASUREMENT

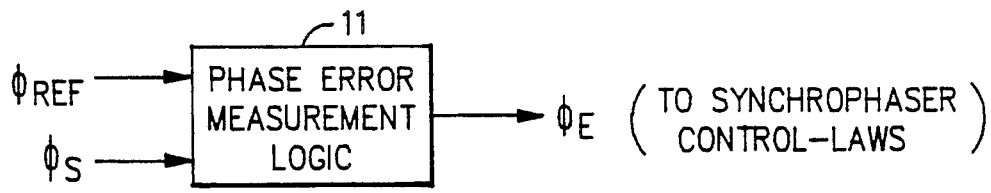

12 — DESCRIPTION OF PHASE ERROR MEASUREMENT LOGIC $$\phi_{EV} = \phi_S + \frac{360}{N_p} * \phi_{COUNT} - \phi_{REF}$$

$$\phi_E = \pm \text{ LIMITED VALUE OF } \phi_{EV}$$

WHERE:

$N_p$ = NUMBER OF PULSES PER REVOLUTION OF PROPELLER $\phi_{COUNT}$ = UP/DOWN COUNT OF $\phi_S$ DISCONTINUITIES
ADD 1 TO $\phi_{COUNT}$ AT $\phi_S$ DECREASE-PHASE
SUBTRACT 1 FROM $\phi_{COUNT}$ AT $\phi_S$ INCREASE-PHASE
THEN LIMIT THE $\pm$ RANGE OF $\phi_{COUNT}$

WHEN SYNCHROPHASING IS INITIATED:

INITIALIZE $\phi_{COUNT}$ = 0.

FIG.6

DESCRIPTION OF PHASE ERROR MEASUREMENT LOGIC
INCLUDING ACCOMODATION FOR LARGE SPEED DIFFERENCE

16 — IF $(N_{MASTER} - N_{SLAVE}) >$ DNMS,
THEN SET $\phi_{COUNT} = \phi_{MAX}$ COUNT $+1$ 17 — IF $(N_{MASTER} - N_{SLAVE}) < -$DNMS,
THEN SET $\phi_{COUNT} = \phi_{MIN}$ COUNT $-1$ $$\phi_{EV} = \phi_S + \frac{360}{N_P} * \phi_{COUNT} - \phi_{REF}$$

$$\phi_E = \pm \text{ LIMITED VALUE OF } \phi_{EV}$$

WHERE:

$\text{DNMS} = \dfrac{24}{N_P * DT} =$ DEFINED LARGE SPEED DIFFERENCE BETWEEN MASTER AND SLAVE SPEEDS.

DT = UPDATE TIME INTERVAL BETWEEN SUCCESSIVE PHASE SENSOR MEASUREMENTS.

NP = NUMBER OF PULSES PER REVOLUTION OF PROPELLER $\phi_{COUNT}$ = UP/DOWN COUNT OF $\phi_S$ DISCONTINUITIES.
ADD 1 TO $\phi_{COUNT}$ AT $\phi_S$ DECREASE-PHASE
SUBTRACT 1 FROM $\phi_{COUNT}$ AT $\phi_S$ INCREASE-PHASE $\phi_{MAX}$ COUNT = PREDEFINED MAXIMUM LIMIT FOR $\phi_{COUNT}$ $\phi_{MIN}$ COUNT = PREDEFINED MINIMUM LIMIT FOR $\phi$ COUNT $\phi_{COUNT}$ IS LIMITED TO THE RANGE FROM $\phi_{MIN}$ COUNT TO $\phi_{MAX}$ COUNT

WHEN SYNCHROPHASING IS INIATED:

INITIALIZE $\phi_{COUNT} = 0$.

FIG.8

METHOD FOR SYNCHROPHASER MEASUREMENT AND SYNCHROPHASER CONTROL

TECHNICAL FIELD

This invention relates to aircraft driven by multiple propellers and/or engines and particularly to a SYNCHROPHASER ®device of the type shown in U.S. Pat. Nos. 4,659,283 and 4,653,981. This invention provides an improved method of measuring the phase relationship between the master and slave propeller.

BACKGROUND ART

Propeller phase synchronizer controls, or SYNCHRONPHASER ®(SYNCHRONPHASER is a registerd trademark of United Technologies Corporation) are known in the prior art for use on multi-engine, propeller driven aircraft to maintain a selected phase angle relationship between a selected "master" propeller and each of the other propellers (designed "slave"-propellers). When the propellers are synchronized the aircraft fuselage experiences minimum acoustic noise and vibration.

The prior art synchronizer controls utilize an electrical pulse to detect the time (T) that each propeller is at a particular blade orientation. This time relationship between successive pulses of the master propeller blakes ($T_M$) and the blade pulses of the slave propeller(s) ($T_D$) is shown in FIG. 1.

The phase relation between any two propellers is then determined from a combination (a) measurement of the time interval between successive pulses from a master propeller ($T_M$) and (b) a measurement of the time delay of a pulse from the master propeller to the next succeeding pulse from a slave (or other) propeller ($T_D$). An example of the time relationship of the pulses (T) from two propellers (designated master propeller ($T_M$) and slave propeller ($T_D$) ) and the method for determining the propeller phase relationship ($\phi_s$) is shown in equation 1.

$$\phi_S = \frac{360}{NP} \frac{T_D}{T_M} \text{ DEGREES} \quad \text{EQUATION 1}$$

Where NP is the number of pulses per revolution of the propeller.

In equation 1, an increasing delay in the interval ($T_D$) yields an increasing sensed phase ($\phi_s$) until the slave pulse is sufficiently delayed to occur with the next master pulse. As the pulses $T_D$ and $T_M$ align, the value of $T_D$ abruptly changes from the value of $t_m$ to 0, resulting in the sensed phase abruptly changing from a maximum value to 0. The sensed phase ($\phi_s$) in comparison to the actual phase is shown in FIG. 2.

Phase error ($\phi_E$) is sensed phase $\phi_s$ minus a reference phase ($\phi_{REF}$) as shown in equation 2.

$$\phi_E = \phi_S - \phi_{REF} \text{ ti 2}$$

The ($\phi_{REF}$) in equation 2 is the phase offset from perfect alignment of blades which is often necessary in providing the lowest noise synchronization of propellers. If minimum noise and vibration occur when the pulses from the master and slave propellers are coincident then no ($\phi_{REF}$) is required. $\phi_{REF}$ is determined by the characteristics of the particular aircraft and its engines.

The present prior art phase synchronizer controls typically utilize one electrical pulse per propeller revolution (NP=1) so that sensed phase between discontinuities provide a phase error measurement up to ±180°. In addition, present phase controls utilize some form of "start circuit" to assure that the master and slave propeller speeds are nearly the same so that the phaser control laws can prevent the phase error from reaching the sign ambiguity that occurs at the phase measurement discontinuity.

DISCLOSURE OF THE INVENTION

This invention includes a method and apparatus for eliminating the phase measurement discontinuity and associated phase error sign ambiguity in the SYNCHROPHASE ® control laws, and in addition provides related improvements in propeller phase sychronizing. The basic procedure for eliminating the discontinuity is as follows:

1. Utilize the discontinuous phase measurement device which is detection of an electrical pulse each time the propeller is at a particular blade orientation and determination of the phase relation between any two propellers (pulses). This is the same as the prior art pulse and phase detection system described above.

2. In addition, this invention provides a device for summing the number of discontinuities in phase measurement (i.e., an up/down counter). A one count increment is added to the existing count value when the phase discontinuity switches from a maximum to zero. Similary, one count is subtracted from the count when the phase discontinuity switches from zero to its maximum.

3. Next, the phase measurement and counted discontinuities are combined to yield a total phase measurement.

The foregoing and other objects, features and advantages of the present invention will become more apparent in the light of the following description of a best mode embodiment thereof as illustrated in the accompanying Drawing.

BRIEF DESCRIPTION OF THE DRAWINGS

FIG. 6 shows a comparison of the prior art phase measurement of $\phi_E$ and the improved phase error measurement of this invention.

FIG. 8 shows phase error measurement logic with accommodation of large speed differences.

BEST MODE FOR CARRYING OUT THE INVENTION

Figure 1:
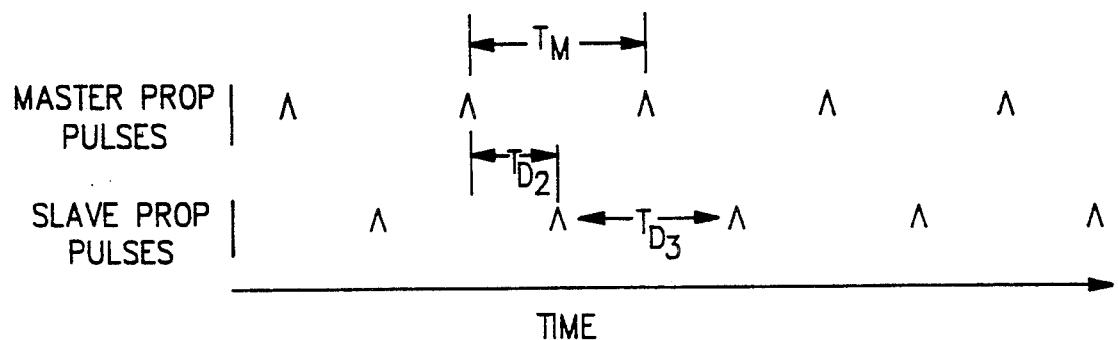
FIG. 1 shows a timing diagram of measurement used to provide information to SYNCHROPHASER ® controls.
Figure 2:
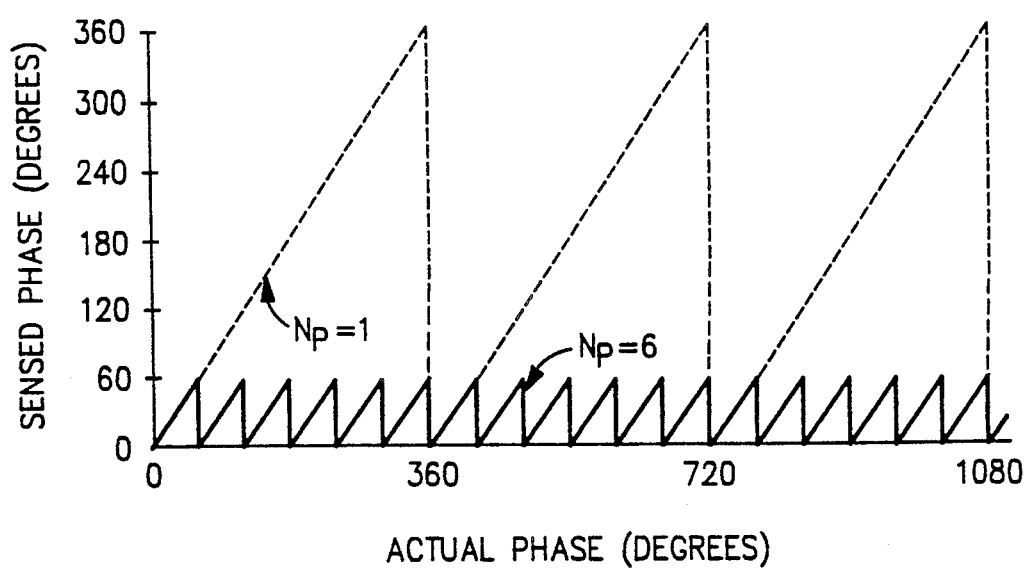
FIG. 2 shows the sensed phase ($\phi_s$) in comparison with the actual phase.
Figure 3:
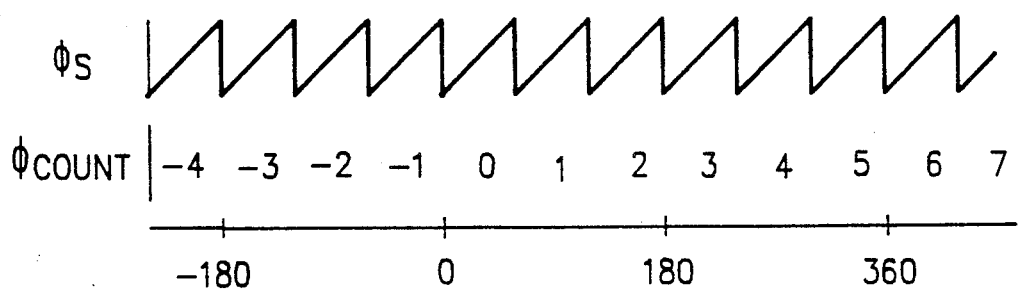
FIG. 3 shows a plot of the sensed phase measurement ($\phi_s$) against the actual phase between propellers.

The improved method for propeller phase measurement in accordance with this invention is set forth hereinbelow. In this example, a propeller having six electrical pulses per revolution (NP=6) is described. A plot of the phase measurement $\phi_s$ and the phase count $\phi_{count}$ (the up/down counter value) versus actual phase between propellers is shown at FIG. 3.

Figure 4:
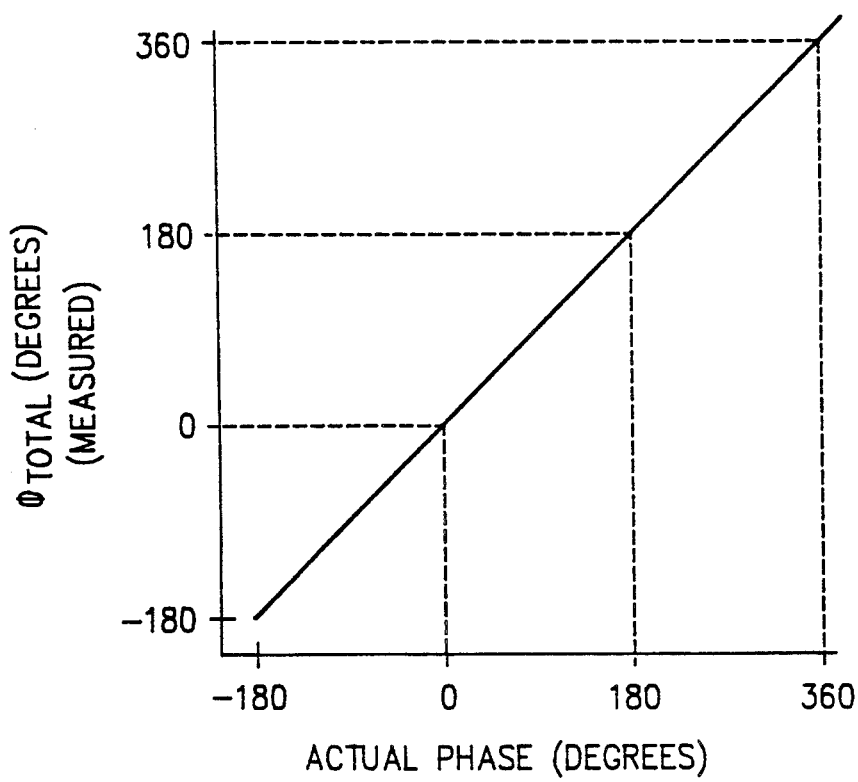
FIG. 4 is a plot of measured phase versus actual phase.

FIG. 4 shows a plot of total measured phase versus the actual phase. The total measured phase is:

$$\phi_{TOTAL} = \phi_S + \frac{360}{NP} \phi_{COUNT} = \phi_S + 60 \phi_{COUNT} \quad \text{EQUATION 3}$$

The phase error measurement $\phi_E$ is the total phase ($\phi$TOTAL) less a referenced phase ($\phi_{REF}$). This is illustrated in equation 4 below.

$$\phi_E = \phi_{TOTAL} - \phi_{REF} \quad (4)$$

In equation 4, 100 $_{REF}$ is the desired phase shift between the master and slave propellers. This phase shift is determined empirically by measuring vibration and noise at different phase settings in an aircraft. Once the phase shift is determined at which minimum noise and vibration are experienced, the desired shift between the master and slave is known, and is commanded in and phase synchronizer control law as $\phi_{REF}$.

Combining equations 3 and 4, an expression for $\phi_E$, phase error, is obtained as shown in equation 5.

$$\phi_E = \phi_S + \frac{360}{NP} \phi_{COUNT} - \phi_{REF} \quad \text{EQUATION 5}$$

Figure 5:
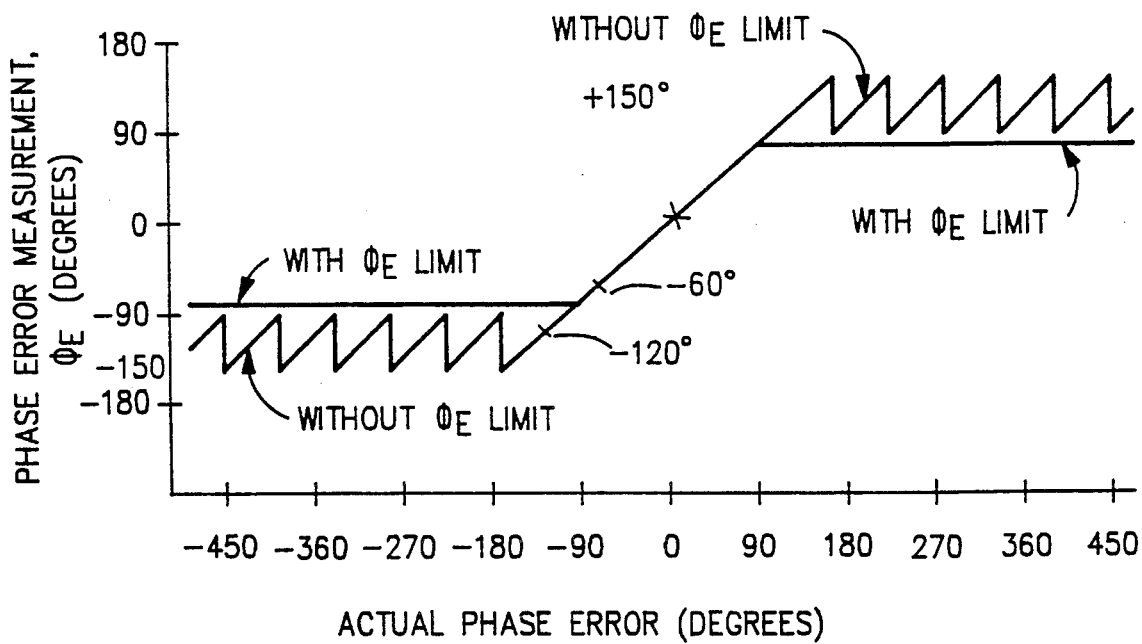
FIG. 5 shows phase error measurement with limits on the phase count and on phase error magnitude.

In the above equation, $N_p$ is the number of pulses per revolution of the propeller. It is also desired that the phase error measurement ($\phi_E$) range be consistent with the control gain and output authority limit. For example, if the propeller has six pulses per revolution and a phase error range ($\phi_s$) of ±80° is desired, then the count must have a range of −2 to +2 as is indicated in FIG. 5 as being +2 or +2 times 60° equals 120° in the positive and negative direction. Limiting the range of $\phi_{COUNT}$ limits the range in phase error measurement ($\phi_s$). The sensed phase ($\phi_s$) discontinuity yields a phase error measurement discontinuity in magnitude, but there is no ambiguity in the sign of the phase error.

FIG. 5 also shows a limit of 2 on $\phi_{COUNT}$. A count of 1 contributes 60° and a count of 2 contributes 120° to phase error measurement. With the count limit at 2, the value of the phase measurement error is 120° plus $\phi_s$. Since $\phi_s$ is in the range of ±30°, then the phase error measurement is in the range of 90° to 150° as shown in equation 6 below.

$$\begin{aligned}
\phi_E &= \phi_S + 60. * \phi_{COUNT} \quad \text{EQUATION 6}\\
&= \pm 30. + 60. * 2 \\
&= \pm 30 + 120. \\
&= 90° \text{ to } 150°
\end{aligned}$$

Similarly, a $\phi_{COUNT}$ of minus 2 (−2) will yield a phase error measurement in the range of −90° to −150°.

Some SYNCHROPHASER ® control-laws may include dynamic compensation involving derivatives that are sensitive to the phase error discontinuity existing at large phase error measurement. These phase error discontinuities are eliminated by limiting the phase error magnitude as shown in FIG. 5. The phase error limits in FIG. 5 are the horizontal lines $\phi_{E\text{-}limit}$ which are at 80° and −80°. The 80° and −80° limits on phase error are seen on the phase error output or the vertical axis of FIG. 5. The 80° and −80° limits on phase error measurement remove the saw tooth pattern in the plot of phase error measurement versus actual phase error shown in FIG. 5.

The resulting phase error measurement $\phi_E$ has no discontinuities and no sign ambiguity. Many functional improvements therefore result from the use of the improved phase error measurement described herein. Significant functional improvements whioh result from this measurement of phase error are as follows:

1. Control-laws as presently required for a SYNCHROPHASER ® "start circuit" are not necessary and may be eliminated.

2. Control logic is eliminated for determining when to utilize the "start circuit" and when to utilize the "phase-control" circuit.

3. The number of electrical pulses per revolution of propeller can be increased up to one pulse per propeller blade. One pulse per blade allows use of every slave propeller blade for synchronizing control rather than a seleot single blade. This multiple blade selection allows the time interval required to align the slave propeller to a master propeller to be reduced, and phase control to begin faster.

4. Increasing the electrical pulses to a pulse-per-blade increases the pulse frequency. Since these electrical pulses are usually also used for propeller speed measurement, the speed measurement dynamic lag is also reduced.

5. The phase error measurement range can be selected to be optimum for the phase control control-laws and is not limited or degraded by the number of electrical pulses per revolution of the propeller.

6. The limit on phase oount determines the maximum amount of phase error that will be recovered. This slipping in phase decreases the phase control recovery time following a gross transient disturbance.

Figure 7:
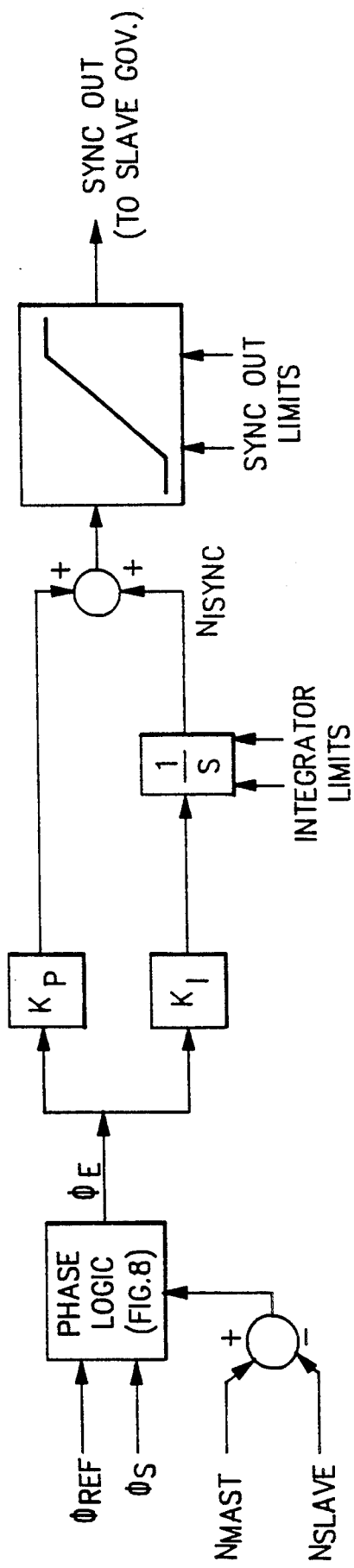
FIG. 7 describes typical SYNCHROPHASER ® control laws as used in the simulation model disclosed herein.

Referring now to FIG. 6, there is shown in outline form the improvement provided by this invention. The prior art phase error measurement as shown at the top of FIG. 6 was merely the comparison of a sensed phase with a reference phase at a summing junction 10. The output phase error from summing junction 10 is sent to a SYNCHROPHASER ® control as shown in FIG. 7. Symbols used in FIG. 7 are included in Table 1.

TABLE 1

Figure 9:
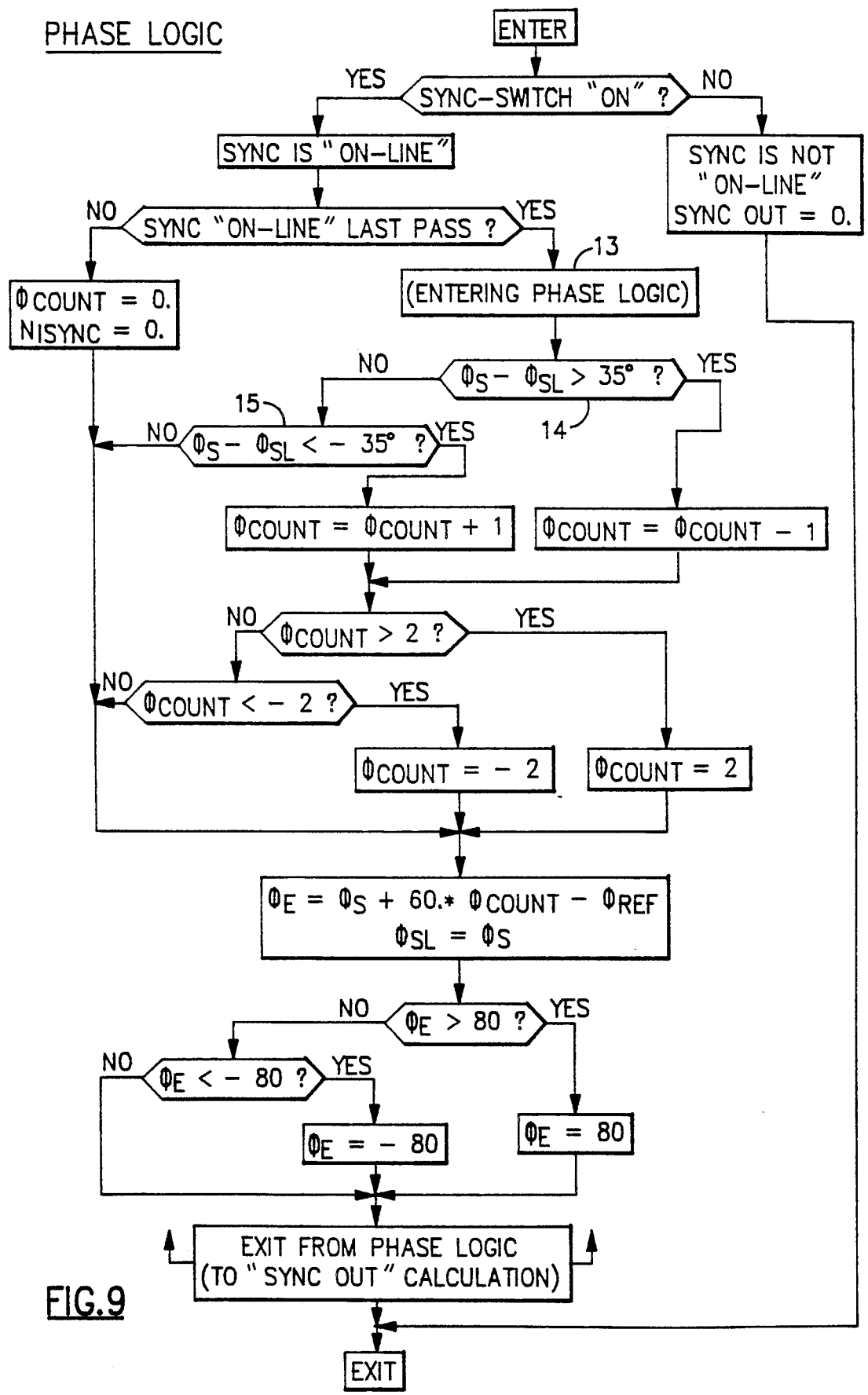
FIG. 9 shows phase logic flow diagram of this invention.
Figure 10:
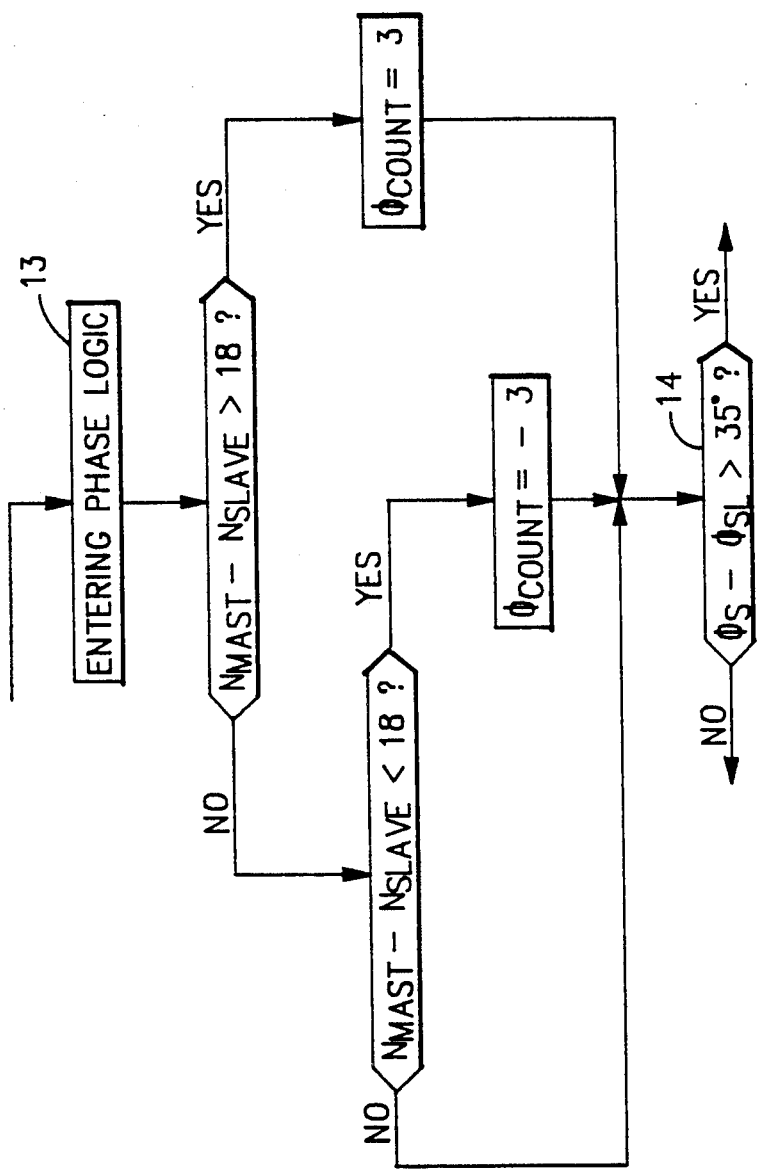
FIG. 10 shows additional phase logic which may be used between blocks 13 and 14 as depicted on FIG. 9.

| DESCRIPTION OF SYMBOLS OF FIGS. 7, 9 AND 10 | |
|---|---|
| $K_I$ | SYNCHROPHASER ® Control-law Integral Gain |
| $K_P$ | SYNCHROPHASER ® Control-law Proportional Gain |
| $N_{ISYNC}$ | SYNCHROPHASER ® Control-law Integrator Output |
| $\phi_{COUNT}$ | Count of phase discontinuities |
| $\phi_E$ | Phase error measurement |
| $\phi_S$ | Phase sensor measurement |
| $\phi_{SL}$ | Previous value of phase sensor measurement |
| $\phi_{REF}$ | Desired phase shift between master and slave pulses |
| NMAST | Master propeller speed |
| NSLAVE | Slave propeller speed |

This invention as can be seen from block 11 of FIG. 6 comprises a phase error measurement logic. Initially, an unlimited phase error $\phi_{EU}$ is determined as a function of the sensed propeller phase relation ($\phi_s$), the count, and the phase reference. The phase error is then limited by limiting the value of $\phi_{EU}$.

SELECTION OF SYNCHROPHASER ® CONTROL UPDATE TIME INTERVAL

The typical digital control used to provide the SYNCHROPHASER ® control logic also provides the control logic such as the logic for the engine control. Many sensed variables must be received into the engine control logic. The time interval required to input each sensed variable is determined, and the maximum permissible time interval between successive measurements of each sensed variable is determined. Since these measurements are input sequentially, a timing priority is also determined. Generally, propeller phase measurement has the lowest priority and consequently the longest time interval between successive phase measurements. A typical time interval between successive phase measurements and hence computations of SYNCHROPHASER ® control logic is 0.2 seconds.

SELECTION OF THE RANGE OF PHASE ERROR, $\phi_E$

The desired range of phase error, $\phi_E$ is dependent on the value of synchronizer control gain and synchronzizer control output authority limit.

It is desired that the control gain be as high as possible to yield a quick transient response, however, the gain must be low enough to yield good dynamic stability. The choice of control gain is dependent upon the propeller governing characteristics and update interval. Therefore, the choice of control gain is dependent upon the particular propulsion system characteristics.

The synchronizer control output authority limit is selected to be as small as possible so that malfunctions cannot cause an excessive change in the speed of the slave propeller (S). However, control output must have sufficient authority to correct for typical control system tolerances and atmospheric disturbances. This output authority limit is typically in the range of ±1% to ±2.5% of propeller governing speed.

Once the control gain and output authority limits have been determined, the desired maximum phase error ($\phi_E$max) can be determined. The phase error range is selected so that the maximum phase error ($\phi_E$ MAX) times the SYNCHROPHASER ® proportional gain ($K_p$) yields a control circuit output approximately equal to the output authority limit as shown in Equation 7.

EQUATION 7

$\phi_{E\,MAX} * K_p \approx$ SYNCHROPHASER ® OUTPUT LIMIT $$\phi_{E\,MAX} \approx \frac{\text{SYNCHROPHASER ® OUTPUT LIMIT}}{K_p} = \frac{\pm 12}{0.2} = \pm 60°.$$

Note that $\phi_E$ max equals ±80° was used in this example.

SELECTION OF RANGE LIMIT FOR COUNTING PHASE MEASUREMENT DISCONTINUITIES

The counter for $\phi_{COUNT}$ is an up/down counter of the number of phase measurement discontinuities as shown in equations 3 and 5. The counter range must be sufficiently large to synthesize the required phase error angle, $\phi_E$, where:

$$\phi_E = \phi_S + \frac{360}{NP} \phi_{COUNT} - \phi_{REF} \quad \text{EQUATION 8}$$

In the case where $\phi_{REF}=0$, $N_p=6$ and $\phi_S=\pm30$, the minimum value of $\phi_{COUNT}$ capable of yeilding $\phi_E = \pm 80°$ for any value of $\phi_S$ is $\phi_{COUNT}=2$. This is shown in the following equations.

EQUATION 9

$$\phi_E = \pm 30 + \frac{360}{6} (2) - 0 = \pm 30 + 120 = 90° \text{ to } 150°$$

$$\phi_E = \pm 30 + \frac{360}{6} (-2) - 0. = \pm 30 - 120 = -90 \text{ to } -150°$$

Therefore, the phase count range limit in this example is selected to be ± 2 counts.

DETECTION OF PHASE DISCONTINUITIES

The phase sensor, $\phi_S$, has a phase discontinuity magnitude equal to 360° divided by $N_p$. In the case where $N_p$ is equal to 6, the $\phi_S$ discontinuity magnitude is 60°. One method for detecting the $\phi_S$ discontinuity is determining when a large change in $\phi_S$ has occurred between successive $\phi_S$ measurements. A large difference between the present sensed phase, $\phi_S$, and the previous sensed phase $\phi_{SL}$, indicates a sensor discontinuity has occurred. That is, $\phi_S$ minus $\phi_{SL}$ equals 60° is a phase sensed discontinuity. However. a speed difference between the master and slave propellers will influence the phase difference, $\phi_S$ minus $\phi_{SL}$ in a manner not related to the phase sensor discontinuity. Therefore, the phase measurement logic must be able to recognize the difference between $\phi_S$ minus $\phi_{SL}$ caused by a $\phi_S$ discontinuity and $\phi_S$ minus $\phi_{SL}$ caused by a difference in master and slave propeller speeds. It is apparent that the nonambiguous theoretical $\phi_S$ minus $\phi_{SL}$ caused by a speed difference must be less than ±50% of the $\phi_S$ discontinuity (that is less than ±30° in this example where $N_p$ equals 6). When $\phi_S$ minus $\phi_{SL}$ is more than ±30°, this indicates a $\phi_S$ discontinuity has occurred, and $\phi_S$ minus $\phi_{SL}$ less than ±30° is caused by a speed difference. However, practical consideration should provide some separation in these two $\phi_S$ minus $\phi_{SL}$ bands. Therefore, a practical limit for $\phi_S$ minus $\phi_{SL}$ caused by a speed difference is ±40% of the sensed discontinuity. This is ±24° when NP=6 as shown in Equation 10 below.

EQUATION 10

$$\phi_S - \phi_{SL} = \pm 40\% \text{ of } \frac{360}{NP} = 0.4 * \frac{360}{6} = \pm 24°$$

$$\pm 24° \text{ in } 0.2 \text{ SECONDS} = \pm 120 \frac{\text{DEGREES}}{\text{SECOND}} = \pm 20. \text{ RPM}$$

∴ LARGE SPEED DIFFERENCE IS GREATER THAN

±20 RPM

Then $\phi_S$ minus $\phi_{SL}$ discontinuities in excess of 60% of the sensor discontinuity (±36° for NP=6) indicate a phase error discontinuity has occurred. In the example shown in FIG. 9, $\phi_S$ minus $\phi_{SL}$ in excess of ±35° (block 14 and block 15) indicates a phase error discontinuity has occurred. Large speed differences (speed differences yielding $\phi_S$ minus $\phi_{SL}$ in excess of 40% of the phase discontinuity) could result in an error in counting the number of phase discontinuities. Therefore, large speed differences must be detected and included in the logic to ensure non-ambiguous computation of $\phi_e$. The phase error measurement logic (reference number 12 in FIG. 6) is modified to accommodate the result of a large speed difference between the master and slave propellers. The speed difference is called large whenever this speed difference yields a propeller phase difference in excess of 40% of $\phi_S$ measurement range in successive $\phi_S$ measurements. Therefore, a speed difference is defined to be large as set forth in Equation 11 below.

$$DNMS = \frac{24.}{NP * DT} \qquad \text{EQUATION 11}$$

where DNMS is the speed difference in RPM between the master and slave propellers that is defined to be large
NP is the number of pulses per propeller revolution
DT is time interval in seconds between successive $\phi_S$ sensor phase measurements The description of phase error measurement logic in reference number 12 FIG. 6 is modified to include logic for large speed differences as shown in FIG. 8. This modification consists of setting $\phi$COUNT equal to the maximum $\phi_{COUNT}$ plus one whenever the master speed minus slave speed is greater than the defined large speed difference DNMS as shown in FIG. 8, reference number 16. The modification also consists of setting $\phi_{COUNT}$ equal to the minimum $\phi_{COUNT}$ minus one whenever the master speed minus slave speed is less than the defined large speed difference ($-$DNMS) as shown in reference numeral 17. The logic having a $\phi_{COUNT}$ of maximum $\phi_{COUNT}$ plus one will assure that the subsequent phase error measurement logic will always result in a maximum value for phase error measurement. Also, the logic having a $\phi_{COUNT}$ of minimum $\phi_{COUNT}$ minus one will assure that the subsequent logic will always result in a minimum value for phase error measurement.

Consider the example where the number of pulses per propeller revolution is 6 (NP = 6) and the $\phi_S$ sensor update interval (DT) is 0.2 seconds. Then use of equation 11 indicates that the speed difference DNMS in excess of 20 RPM is defined to be large. FIG. 9 shows phase logic for this specific example to accomplish the phase error measurement logic described in general terms in FIG. 6. FIG. 10 shows an example of the phase logic modification as described in general terms in FIG. 8, reference numerals 16 and 17. Symbols used in FIGS. 9 and 10 are defined in Table 1. FIG. 9 utilizes 18 RPM as the defined large speed difference, DMNS. The logic in FIG. 9 plus the logic in FIG. 10 provides the complete logic set for phase error measurement logic in this example. The logic in FIG. 10 is imbedded into the logic in FIG. 9 at the location between "entering phase logic" block 13 and the decision block 14. Note that a speed difference of +18 RPM with a 0.2 second update interval yields $\phi_S - \phi_{SL}$ equal $\pm 21.6°$ or 36% of the phase sensor discontinuity. The logic provides a non-ambiguous value of for any speed difference between master and slave propeller speeds.

What is claimed is:

1. Apparatus for controlling the relative spatial positioning of blades on different propellers of a multi-engine aircraft of the type having blade pitch control to vary each propeller's blade pitch angle to regulate actual propeller speed in a manner to reduce a difference speed error between an actual speed signal and a propeller reference speed signal, the apparatus controlling blade positioning by adjusting the blade pitch angle of each designated slave propeller to achieve a desired phase angle offset between each slave propeller and a designated master propeller, comprising:

sensor means, one for each engine, for providing a signal pulse in response to rotation of each propeller blade past a reference point, the real time interval between successive said signal pulses from the master propeller being designated $T_M$ and the real time interval between each master propeller signal pulse and a next succeeding said signal pulse for a slave propeller being designated $T_D$;

signal processing means, responsive to said signal pulses from each said sensor means, and having memory means for storing a first executable algorithm for calculating individual phase error signals ($\phi_E$), each representative of the difference angular displacement between a reference phase value ($\phi_{REF}$) and the actual angular displacement in blade position between the master propeller and each slave propeller, as defined by the equation:

$$\phi_E = \phi_{REF} - \left[ \frac{360°}{NP} \times \frac{T_D}{T_M} \right];$$

where NP is equal to the number of propeller blades; and signal summing means, for summing each said individual phase error signal with the related propeller reference speed signal to produce a modified difference speed error therefor to adjust each slave propeller's blade pitch angle in a manner to reduce the magnitude of each said phase error;

as characterized by the improvement, comprising:

counter means, responsive to each said calculated phase error signal for incrementing a standing count value ($\phi_{COUNT}$) by one unit value for each positive value discontinuity occurring in a calculated phase error signal and for decrementing said standing count value for each negative value discontinuity occurring therein; and wherein said memory means further includes a second executable algorithm for calculating improved accuracy phase error signals as defined by the equation:

$$\phi_E = \phi_{REF} - \left\{ \frac{360°}{NP} \times \frac{T_D}{T_M} + \frac{360°}{NP} \times \phi_{COUNT} \right\};$$

said improved accuracy phase error signals being presented to said signal summing means for summation with the related propeller reference speed signal to produce said modified speed reference speed error.

2. The apparatus of claim 1 wherein the value of $\phi_{COUNT}$ (number of disconintuities) is limited to an amount which provides a range in degrees which is less than a predetermined amount.

3. The apparatus of claim 2 wherein said range is an integral amount.

4. The apparatus of claim 2 wherein said predetermined amount is an amount which exceeds a limit placed on the phase error measured ($\phi_E$).

5. The apparatus of claim 2 wherein if the speed of the master exceeds that of the slave by a predetermined amount, the value of $\phi_{COUNT}$ will have an additional amount added to it.

6. The apparatus of claim 5 wherein if the speed of the master exceeds from the speed of the slave by 18 or more RPM, the value of $\phi_{COUNT}$ will have an additional amount added to it.

7. The apparatus of claim 5 wherein said speed difference between said master and slave is an inherent propeller characteristic of the relation between speed difference and change in phase with time.

8. The apparatus of claim 2 wherein said speed of the master is much less than the slave, the value of $\phi_{COUNT}$ will have an amount substracted from it.

9. The apparatus of claim 2 wherein a limit is placed on the magnitude of error measured, ($\phi_E$).

10. The apparatus of claim 9 wherein said limit on magnitude of phase error ($\phi_E$) eliminates phase error disconintuities existing at larger phase error measurements.

11. The apparatus of claim 9 wherein said limit on phase error ($\phi_E$) is $\pm 80°$.

* * * * *